(12) United States Patent
Jiang

(10) Patent No.: US 8,827,323 B2
(45) Date of Patent: Sep. 9, 2014

(54) CHASSIS ASSEMBLY

(75) Inventor: Yue-Wen Jiang, Taoyuan County (TW)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 87 days.

(21) Appl. No.: 13/222,815

(22) Filed: Aug. 31, 2011

(65) Prior Publication Data
US 2012/0169197 A1 Jul. 5, 2012

(30) Foreign Application Priority Data

Dec. 31, 2010 (CN) .......................... 2010 1 0623334

(51) Int. Cl.
*E05C 1/02* (2006.01)
(52) U.S. Cl.
USPC ........................................................ 292/137
(58) Field of Classification Search
CPC ........... E05C 1/10; E05C 19/028; E05C 3/14; E05B 83/30
USPC ........... 292/137, 16, 32, 33, 95, 96, 116, 156, 292/DIG. 11, DIG. 12, 19, 163, 1
See application file for complete search history.

(56) References Cited

U.S. PATENT DOCUMENTS

| | | | | |
|---|---|---|---|---|
| 5,743,606 A | * | 4/1998 | Scholder | 312/223.2 |
| 5,751,545 A | * | 5/1998 | Jung | 361/679.58 |
| 7,184,262 B2 | * | 2/2007 | Hsu et al. | 361/679.27 |
| 7,486,506 B2 | * | 2/2009 | Chen et al. | 361/679.02 |
| 7,793,312 B2 | * | 9/2010 | Yang | 720/610 |
| 2006/0108812 A1 | * | 5/2006 | Chen et al. | 292/300 |
| 2006/0261600 A1 | * | 11/2006 | Lee | 292/175 |
| 2006/0267463 A1 | * | 11/2006 | Peng et al. | 312/223.2 |
| 2007/0001559 A1 | * | 1/2007 | Chen et al. | 312/223.2 |
| 2007/0096474 A1 | * | 5/2007 | Ye et al. | 292/121 |

* cited by examiner

*Primary Examiner* — Kristina Fulton
*Assistant Examiner* — Nathan Cumar
(74) *Attorney, Agent, or Firm* — Li & Cai Intellectual Property (USA) Office

(57) ABSTRACT

The chassis assembly comprises a main housing, a latching module and a cover plate. The main housing has at least a side plate which has at least one track portion on the inner surface thereof. The latching module is slidably assembled to the side plate and includes a first locking member slidably assembled on the track portion and having at least one retaining portion; an elastic member connected between the latching module and the side plate; and a second locking member assembled with the first locking member and sandwiching the side plate with the first locking member. The cover plate is detachably assembled to the main housing, and includes at least one stator portion corresponding to the retaining portion.

10 Claims, 14 Drawing Sheets

CHASSIS ASSEMBLY

BACKGROUND OF THE INVENTION

1. Field of the Invention

The instant disclosure relates to a chassis assembly; in particular, a chassis assembly constructed by a cover plate and a main housing in a screw-less manner.

2. Description of Related Art

The traditional computer casing is constructed by securing cover(s) onto the main casing with screws. In detail, the cover(s) is assembled on the main casing by fixing screws into through holes on the cover and threaded holes on the main casing. Particularly, tools, such as screw driver, are necessary to secure or unsecure the screws. On the other hand, more space is needed for operating the tools. Hence, it is complex and un-efficient to secure/unsecure the screws while assembling/disassembling the cover. Further, it is not convenient for repairing the electronic device inside the computer casing.

Another traditional screw is used to assemble/disassemble the cover by hand-operation, i.e., the tools are not necessary. However, in practice, the screws are easily lost, and this would result in the unlocked and unstable computer casing.

On the other hand, when the screw is inserted or removed, the screw sometimes reaches higher torques and is stripped off. Thus, the stripped threads of the screw or the threaded hole fail to provide the stably secure assembling of the cover and the main casing and while moving the computer casing, the accident is caused and the failure of the electronic device inside the computer casing are even resulted.

SUMMARY OF THE INVENTION

One object of the instant disclosure is to provide a chassis assembly. By the interfering manner of a latching module on a main housing of the chassis assembly and a cover plate of the chassis assembly, a stator portion of the cover plate is fixedly secured to a retaining portion of the main housing so as to assemble the cover plate onto the main housing. Furthermore, the cover plate has a block portion to temporarily locate the latching module at a release position. In the release position, the stator portion of the cover plate is released from the retaining portion; therefore, the cover plate can be drawn back and then disassembled from the main housing.

The chassis assembly comprises a main housing, a latching module and a cover plate. The main housing has at least a side plate which has at least one track portion on the inner surface thereof. The latching module is slidably assembled to the side plate and includes a first locking member slidably assembled on the track portion and having at least one retaining portion; an elastic member connected between the latching module and the side plate; and a second locking member assembled with the first locking member and sandwiching the side plate with the first locking member. The cover plate is detachably assembled to the main housing and includes at least one stator portion corresponding to the retaining portion.

The instant disclosure mainly offers a latching module to replace the traditional screw. A user can slide the cover plate on the main housing for securing the stator portion of the cover plate to the retaining portion of the main housing. Hence, the cover plate is assembled onto the main housing to construct a chassis assembly of the instant disclosure. While disassembling the cover plate from the main housing, the latching module is slide to be temporarily located at the release position. Then, the cover plate can be drawn away from the main housing. Accordingly, the cover plate and the main housing can be assembled/disassembled by a screw-less manner and it is more convenient for a user to assemble/disassemble the cover plate and the main housing.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

The instant disclosure provides a chassis assembly which is constructed by a main housing, a latching module and a cover plate. The latching module assembled on the main housing are cooperated with a stator portion and a block portion on the cover plate so that the cover plate can fixedly assembled on the main housing in one movement. Furthermore, while the latching module is moving from a lock position to a release position, the cover plate can be disassembled with the main housing by sliding the cover plate. Accordingly, the instant disclosure provides a screw-less chassis assembly. The instant disclosure set forth efficient assembling of the chassis assembly using the latching module on the main housing to catch the stator portion of the cover plate. In addition, users can push the latching module from the lock position to the release position for disassembling the cover plate from the main housing.

Figure 1:
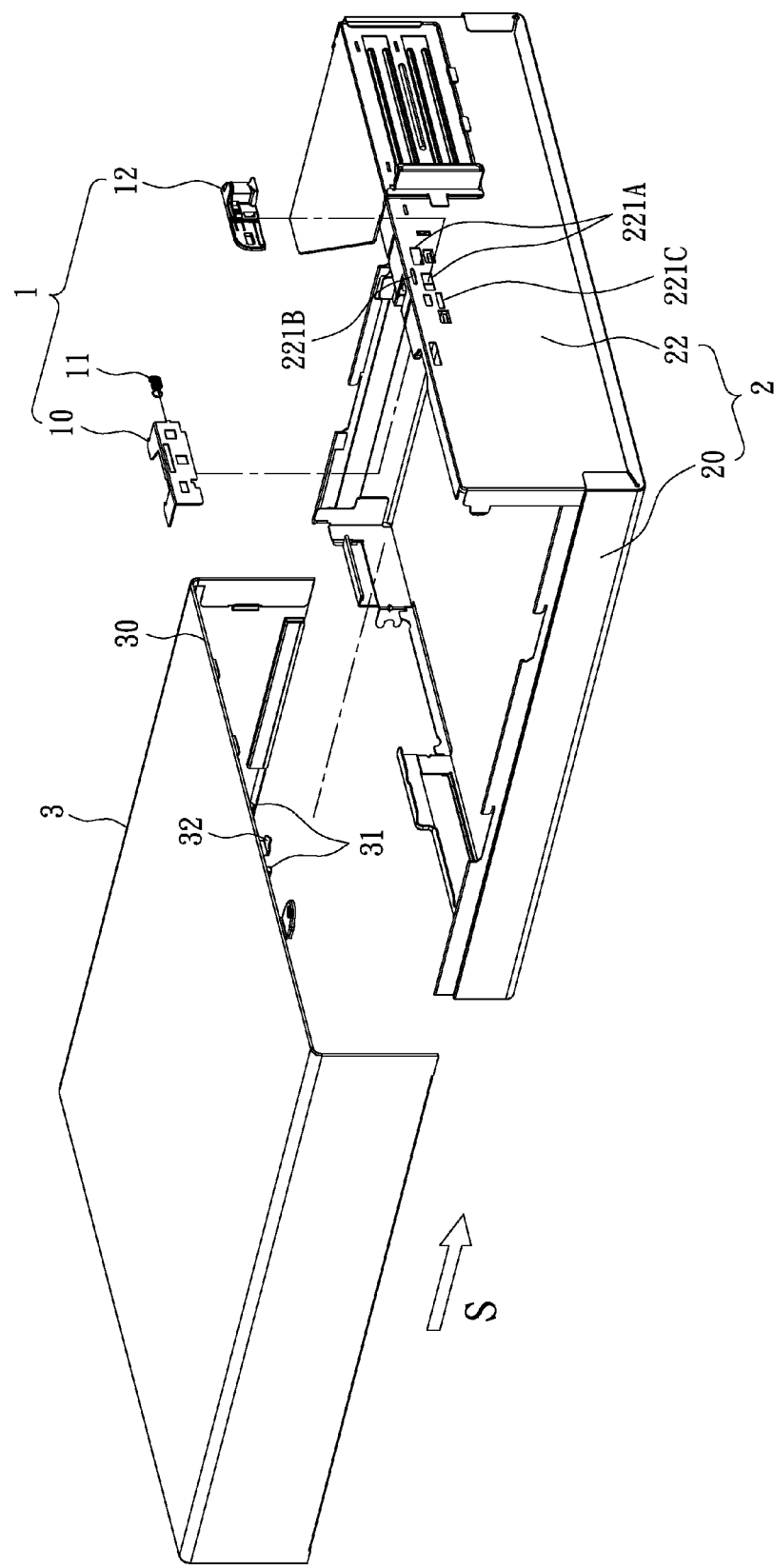
FIG. 1 shows the exploded view of the chassis assembly of the instant disclosure.

Please refer to FIG. 1, where the latching module 1 of the instant disclosure comprises a first locking member 10, an elastic member 11 and a second locking member 12. In exemplary embodiment, the latching module 1 is disposed on a pushing-forward main housing 2 for assembling the cover plate 3 (for example, but not restricted, a top cover plate) thereon.

Figure 2:
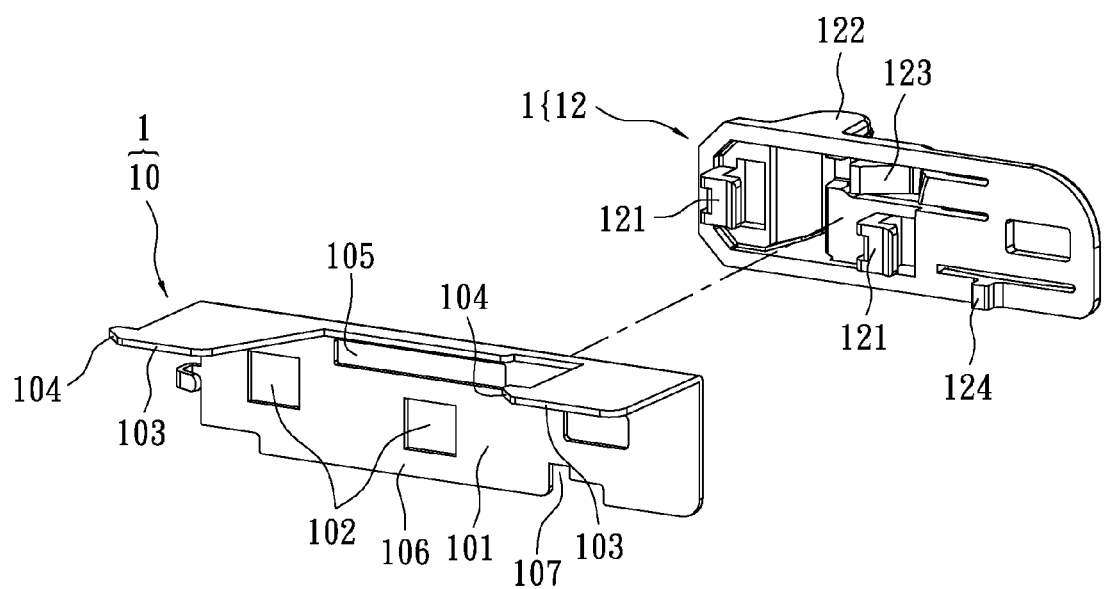
FIG. 2 shows the exploded view of the latching module (without showing the elastic member) of the instant disclosure.
Figure 2A:
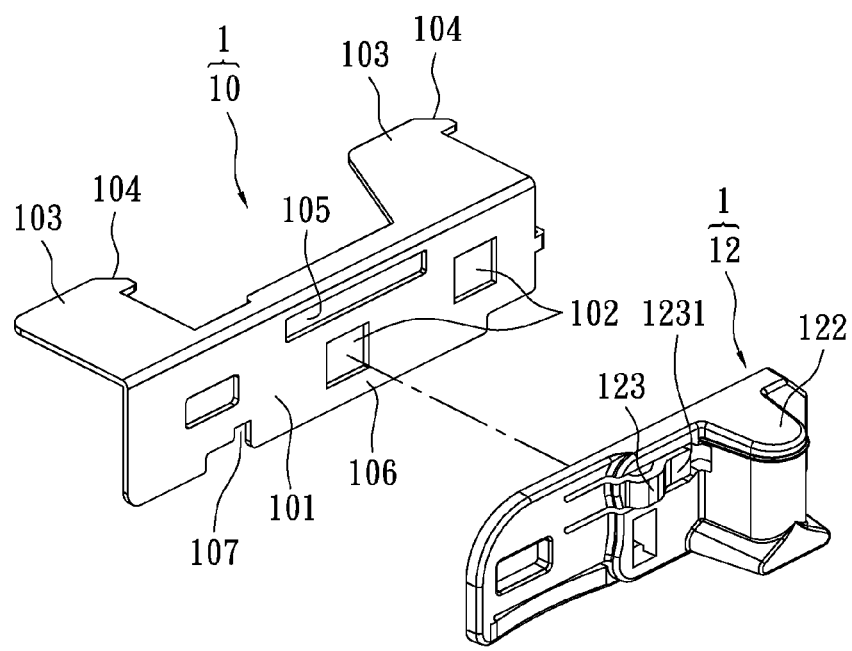
FIG. 2A shows another exploded view of the latching module (without showing the elastic member) of the instant disclosure.

Referring also to FIGS. 2 and 2A, the first locking member 10 has a plate body 101 and the plate body 101 has a plurality of assembling holes 102. Furthermore, the plate body 101 is bent to form at least one retaining portion, for example a locking hook portion 103. Preferably, the first locking member 10 can be a metal part. In exemplary embodiment, the plate body 101 is bent to form two locking hook portions 103, but is not restricted thereby. In addition, each retaining portion (i.e., the locking hook portion 103) has a first guiding inclined-surface 104 thereon. Please note that the structure of the retaining portion is not restricted by hook-shape, in other words, the retaining portion can have any shape to cooperate with the following stator portions 31.

The second locking member 12 is assembled to the first locking member 10 with a side plate 22 of the main housing 2 sandwiched therebetween. Please note that the side plate 22 is not shown in FIG. 2 for the sake of simplicity. The second locking member 12 has a plurality of assembling hooks 121 respectively corresponding to and cooperated with the assembling holes 102 of the first locking member 10. In this manner, the assembling hooks 121 of the second locking member 12 will catch the plate body 101 of the first locking member 10 through the assembling holes 102. As shown in FIG. 1, the first and the second locking members 10, 12 are respectively assembled onto the inner and the outer surfaces of the side plate 22. Moreover, the second locking member 12 has a push portion 122 and a tongue portion 123. A user can force on the push portion 122 to slide the first and the second locking members 10, 12 of the latching module 1. The tongue portion 123 can be stopped by a specific structure of the cover plate 3 to retain the latching module 1 at the release position, as described hereinafter.

Figure 1A:
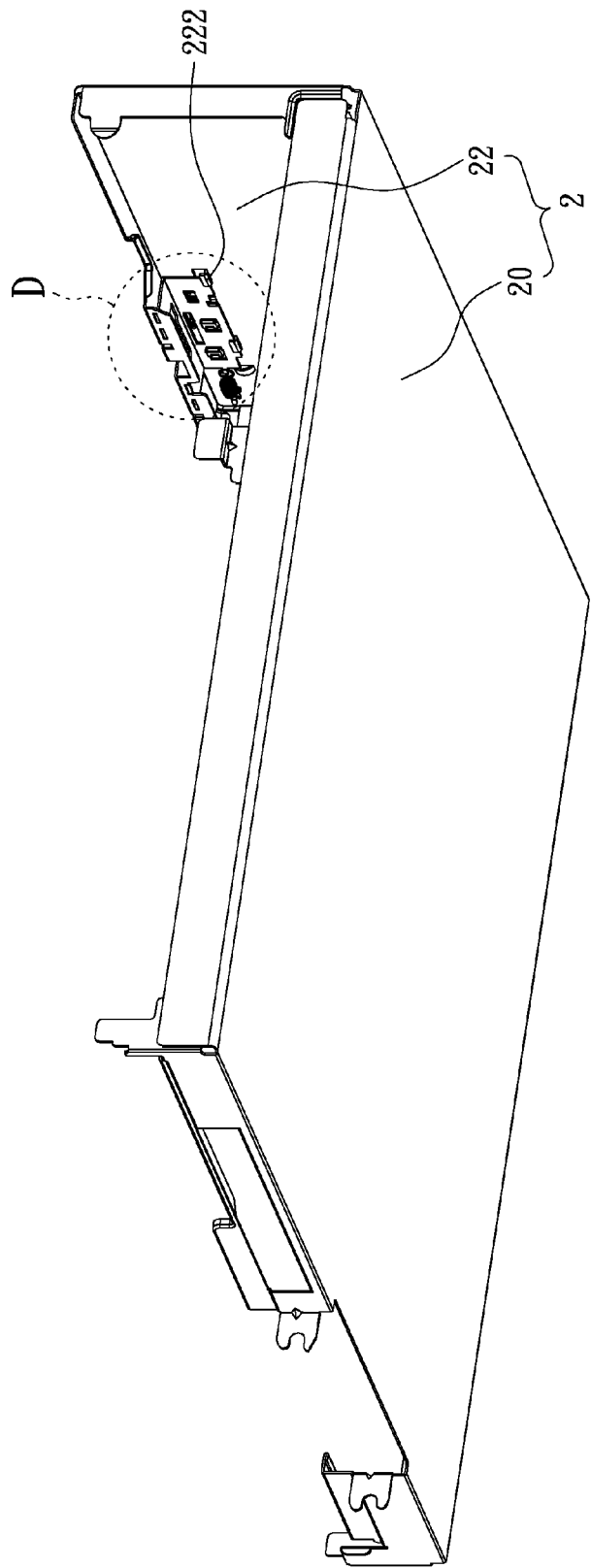
FIG. 1A shows the assembled schematic view of the main housing and the latching module of the chassis assembly of the instant disclosure.
Figure 1B:
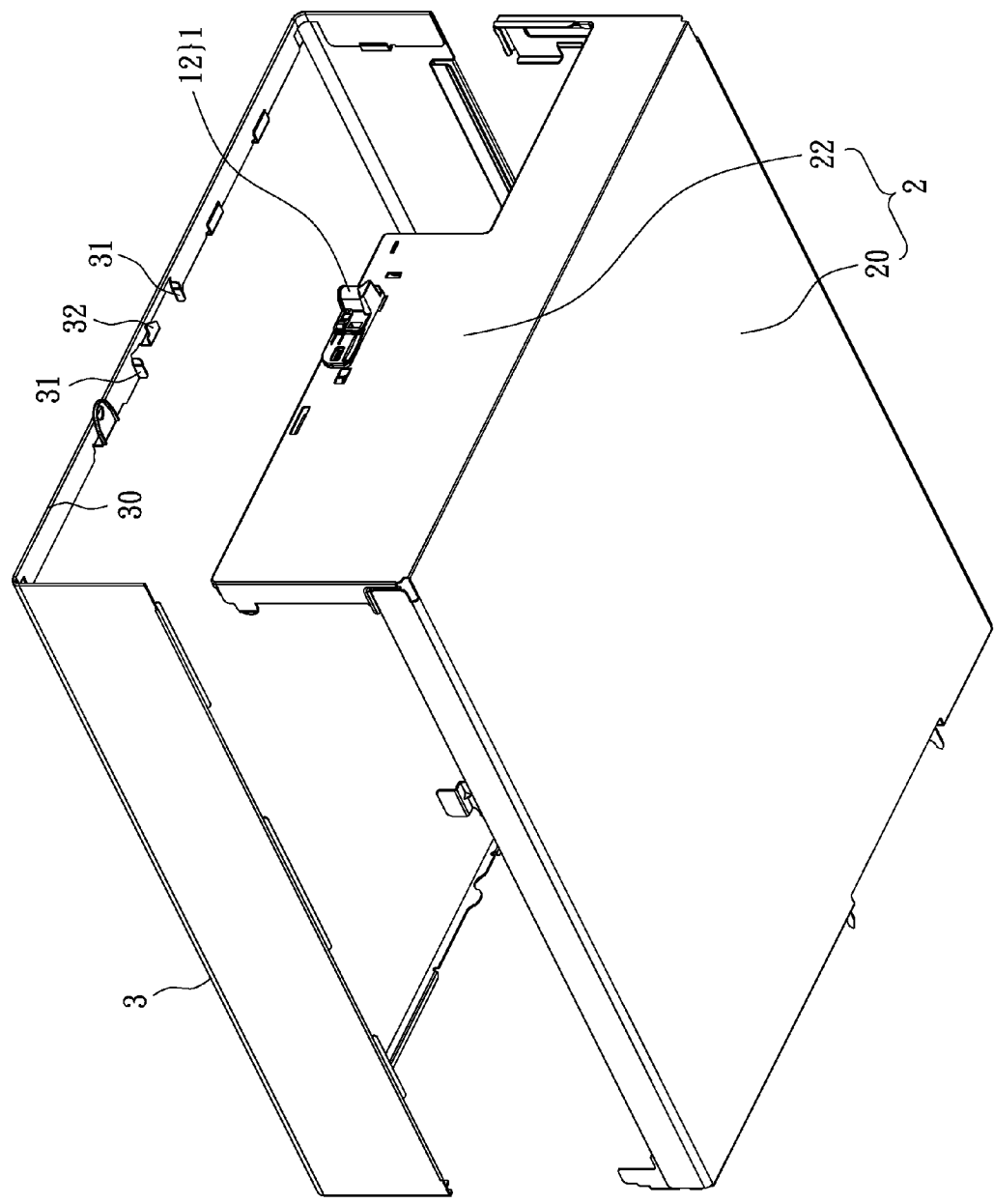
FIG. 1B shows the schematic view of the cover plate of the instant disclosure.
Figure 1C:
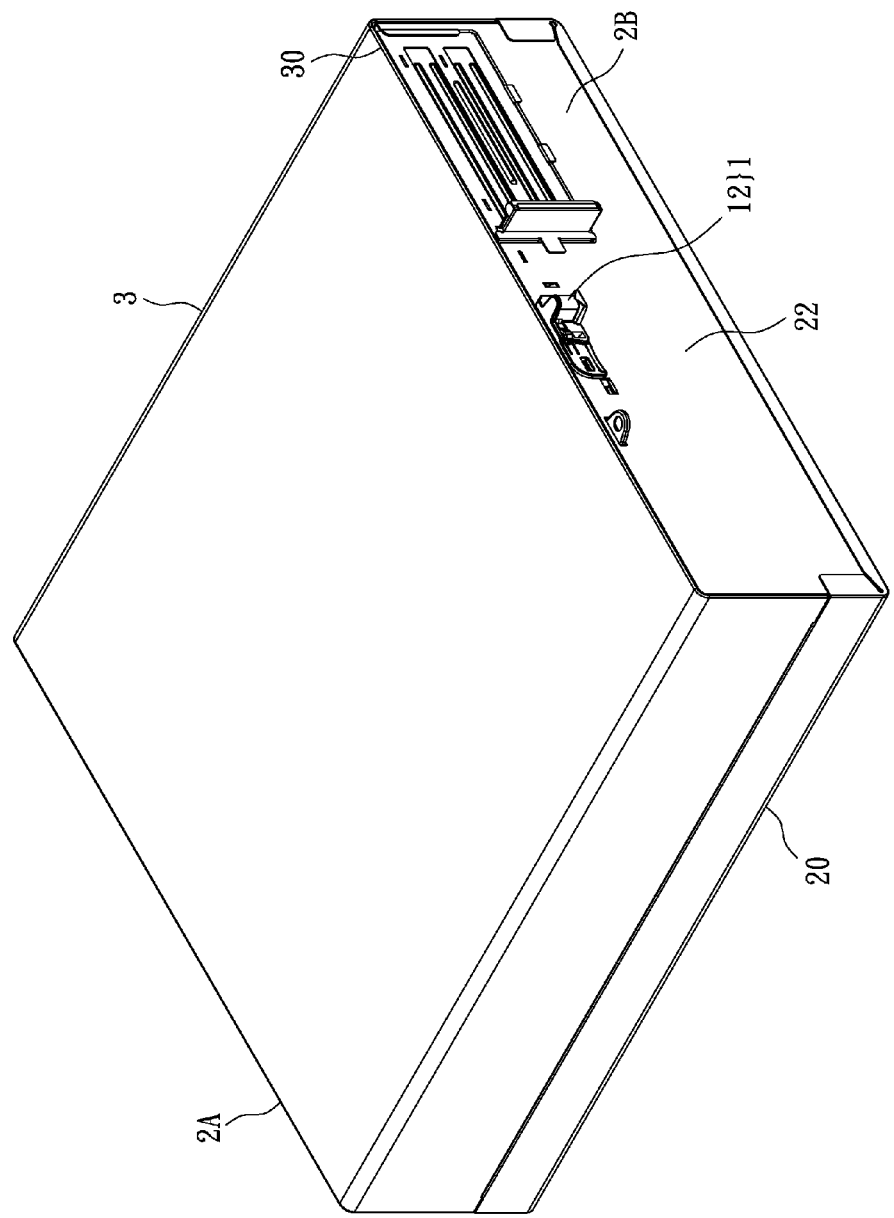
FIG. 1C shows the assembling of the chassis assembly of the instant disclosure.
Figure 1D:
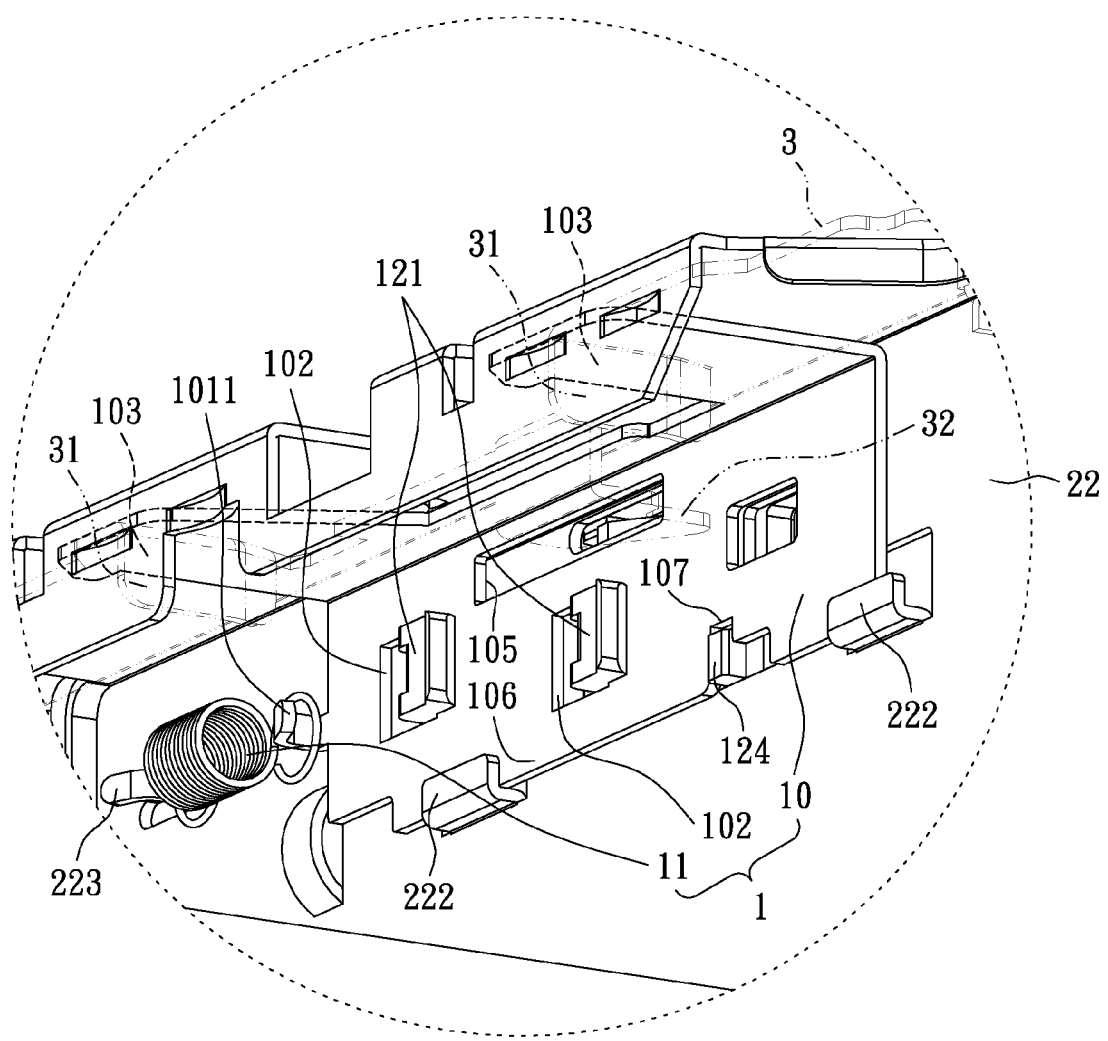
FIG. 1D is the enlarged view of part D in FIG. 1A showing the first locking member and the elastic member of the instant disclosure.
Figure 4:
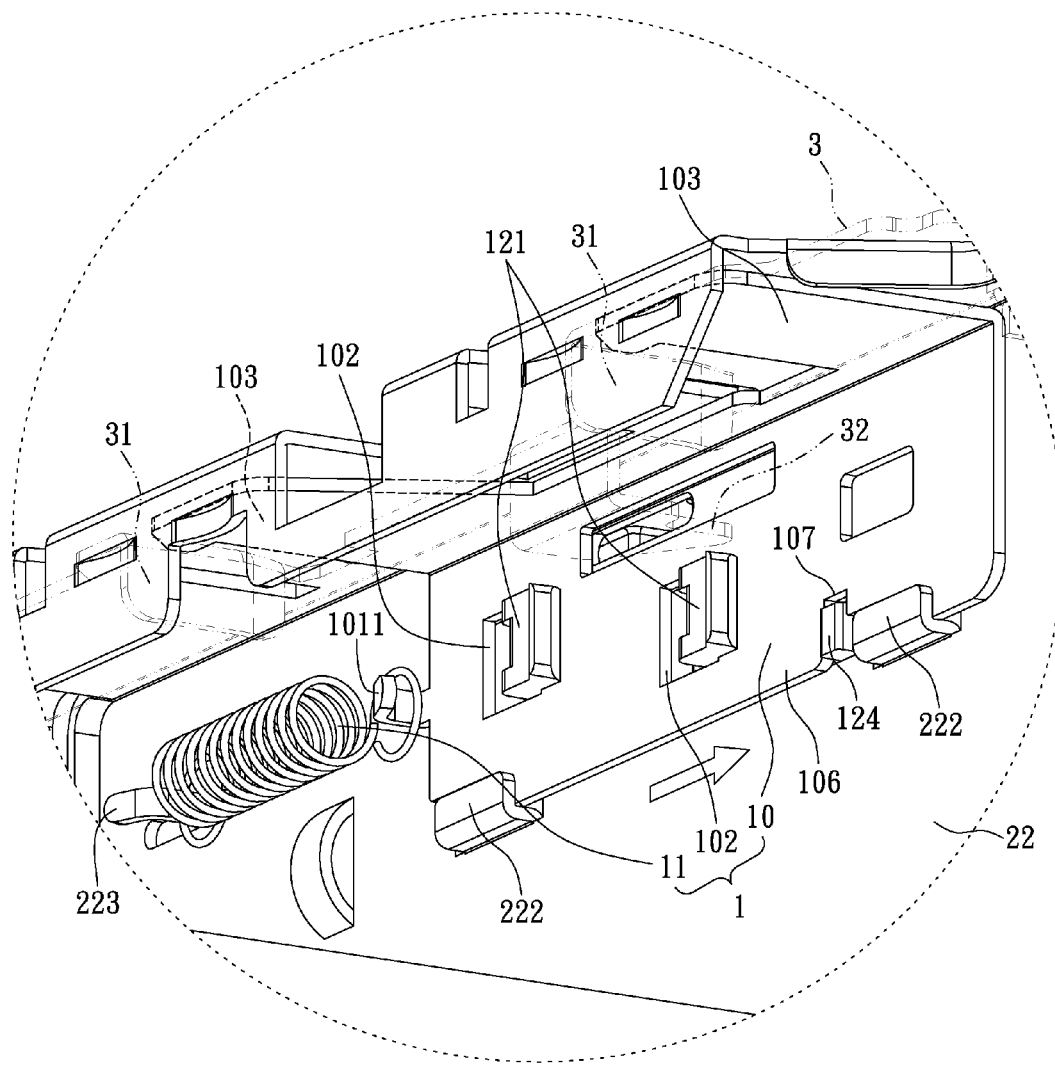
FIGS. 4 and 4A respectively show the deformation of the elastic member and the position of the second locking member when the latching module is pushed.

The elastic member 11 connects the latching module 1 to the main housing 2 as shown in FIGS. 1D and 4 to provide the latching module 1 with a resilient force such that when the cover plate 3 is drawn out from the main housing 2, the latching module 1 can automatically return to the lock position. In this embodiment, the elastic member 11 can be a spring with one end thereof connects to the plate body 101 of the first locking member 10 and the other end thereof connects to the main housing 2. For example, a first end of the spring is hooked on a first hook 223 formed on the inner surface of the side plate 22 (such as a back plate of the main housing 2) and a second end of the spring is hooked on a second hook 1011 formed on the plate body 101 of the first locking member 10. However, the location and connection of the elastic member 11 are not restricted by the aforementioned. Alternatively, the first and second hooks 223, 1011 can be formed on any desired positions. For example, the elastic member 11 can be assembled between the second locking member 12 and the main housing 2. Moreover, the elastic member 11 can be fixedly secured between the first locking member 10 or the second locking member 12 and the main housing 2 by means of suitable fastening elements such as hooks (as described foregoing), rivets and so on.

Figure 1E:
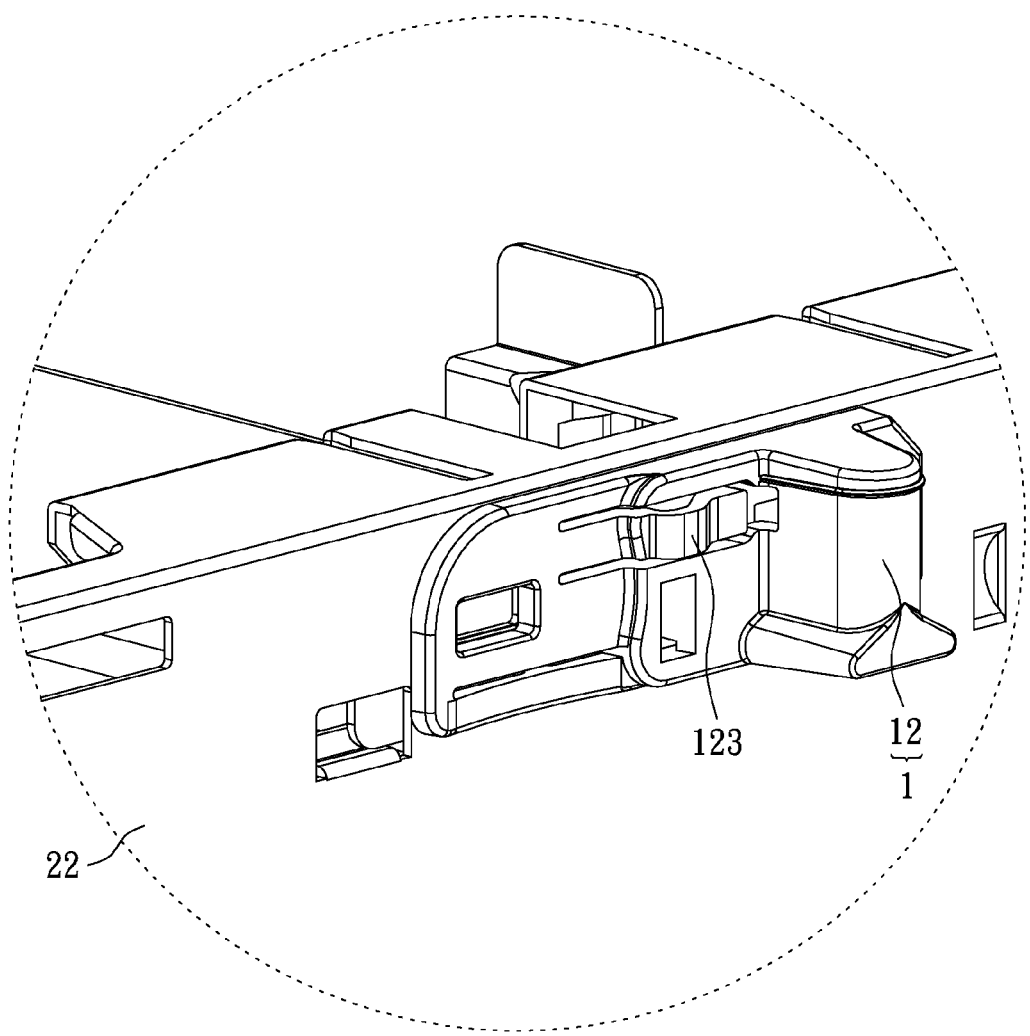
FIG. 1E is the enlarged view of part D in FIG. 1A showing the second locking member of the instant disclosure.

Please refer FIGS. 1 to 1E; the latching module 1, as shown, is assembled onto the side plate 22 of the main housing 2. In this embodiment, the main housing 2 includes a bottom plate 20 and the side plate 22 bends from the bottom plate 20. The cover plate 3 can be slidly pushed toward or drawn away from the side plate 22. The bottom plate 20, the side plate 22 and the cover plate 3 are constructed to define a receiving compartment for accommodating electronic devices, such as PCB, CPU, disk driver (e.g., optical disk driver, floppy driver, and hard-disk driver), power-supply unit and so on. However, the latching module 1 of the present invention can be employed for casing of any apparatus.

As shown in FIGS. 1, 1A and 1D, the side plate 22 has a plurality of first holes 221A, one second hole 221B and one third hole 221C. The side plate 22 has at least one track portion 222 on the inner surface thereof and corresponding to the first locking member 10 so that the first locking member 10 is slidably assembled to the track portion 222. The two locking hook portions 103 and a side portion 106 are respectively formed on the upper side and bottom side of the plate body 101 of the first locking member 10. The plate body 101 is slidably attached on the inner surface of the side plate 22 and the side portion 106 of the plate body 101 is slidably engaged with the track portion 222. In exemplary embodiment, two track portions 222 are formed on the inner surface of the side plate 22, but not restricted thereby. Furthermore, the locking hook portions 103 extend toward the interior of the main housing 2 (i.e., the receiving compartment). The plate body 101 has a fourth hole 105 corresponding to the second hole 221B. During assembling the second locking member 12 to the first locking member 10, each of the assembling hooks 121 penetrates through the corresponding first hole 221A of the side plate 22 and then engages to the corresponding assembling hole 102 of the plate body 101 so that the side plate 22 is securely sandwiched between the first and the second locking members 10, 12. Moreover, the push portion 122 of the second locking member 12 protrudes out of the main housing 2 so that the user can force on the push portion 122 to move the latching module 1 as the arrow shown in FIG. 4A. One end of the elastic member 11 is secured on the second hook 1011 of the plate body 101 and the other end of the elastic member 11 is connected to the main housing 2, for example, secured onto the first hook 223 formed on the inner surface of the side plate 22. In addition, the plate body 101 of the first locking member 10 has a first abutting portion 107 such as a concave at the bottom side thereof. The second locking member 12 has a second abutting portion 124 such as a protrusion, which extends toward the interior of the main housing 2 (i.e., the receiving compartment) and penetrates through the third hole 221C to engage with the first abutting portion 107 of the first locking member 10. By the engagement of the assembling hooks 121 with the assembling holes 102, and the first abutting portion 107 with the second abutting portion 124, the first locking member 10 and the second locking member 12 are securely linked with each other in a multi-axis manner. In an alternatively embodiment, the second abutting portion 124 and the first abutting portion 107 can be a screw and a threaded hole, respectively.

Figure 3:
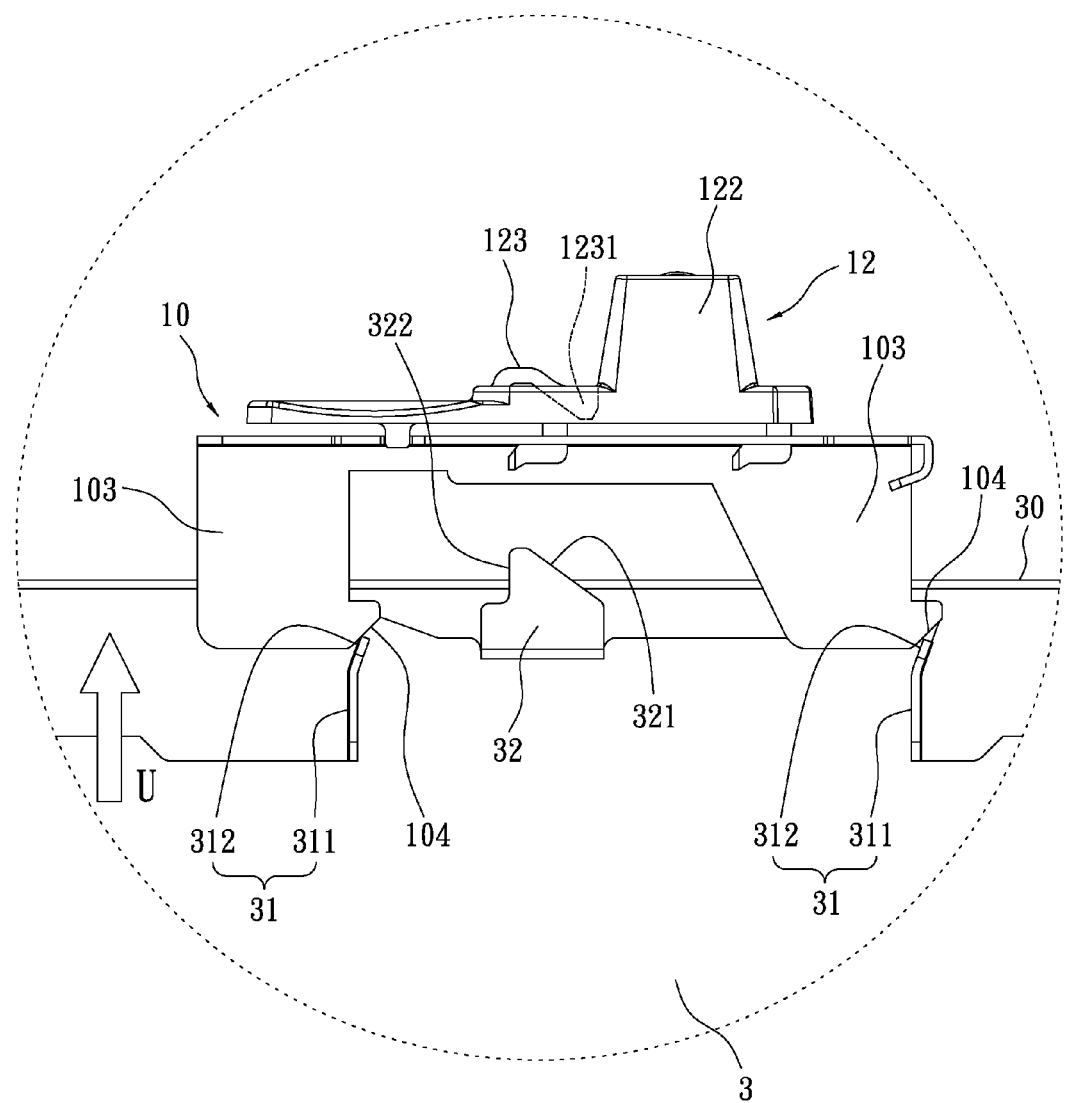
FIGS. 3 to 3B show the movements of the cover plate and the latching module when the cover plate of the instant disclosure slides to secure on the main housing.

On the other hand, the cover plate 3 has a fixing structure corresponding to the latching module 1. Hereinafter, the direction to which the first surface 2A of the main housing 2 as shown in FIGS. 1 and 1C faces is defined as the front. On the contrary, the direction to which the second surface 2B of the main housing 2 faces is defined as the rear. A rear flange 30 of the cover plate 3 has stator portions 31 respectively corresponding to the locking hook portions 103 and a block portion 32 corresponding to the tongue portion 123 of the second locking member 12. As shown in FIGS. 1B and 3, the cover plate 3 preferably has two stator portions 31 and one block portion 32 between the two stator portions 31, and the stator portions 31 and the block portion 32 are preferably formed by bending from the cover plate 3. In addition, each stator portion 31 is a bending structure with an arc-portion or a bent portion corresponding to the first guiding inclined-surface 104 of the locking hook portion 103 of the first locking member 10. In detail, each stator portion 31 has a first stator segment 311 and a second stator segment 312 extendedly bent from the first stator segment 311. In other words, the connection between the first and the second stator segments 311, 312 forms an arc or a bend. The block portion 32 has a second guiding inclined-surface 321 corresponding to the free end 1231 of the tongue portion 123 and a stopper surface 322 for abutting against the free end 1231 of the tongue portion 123. The second guiding inclined-surface 321 and the stopper surface 322 are formed at the front end of the block portion 32.

Figure 3A:
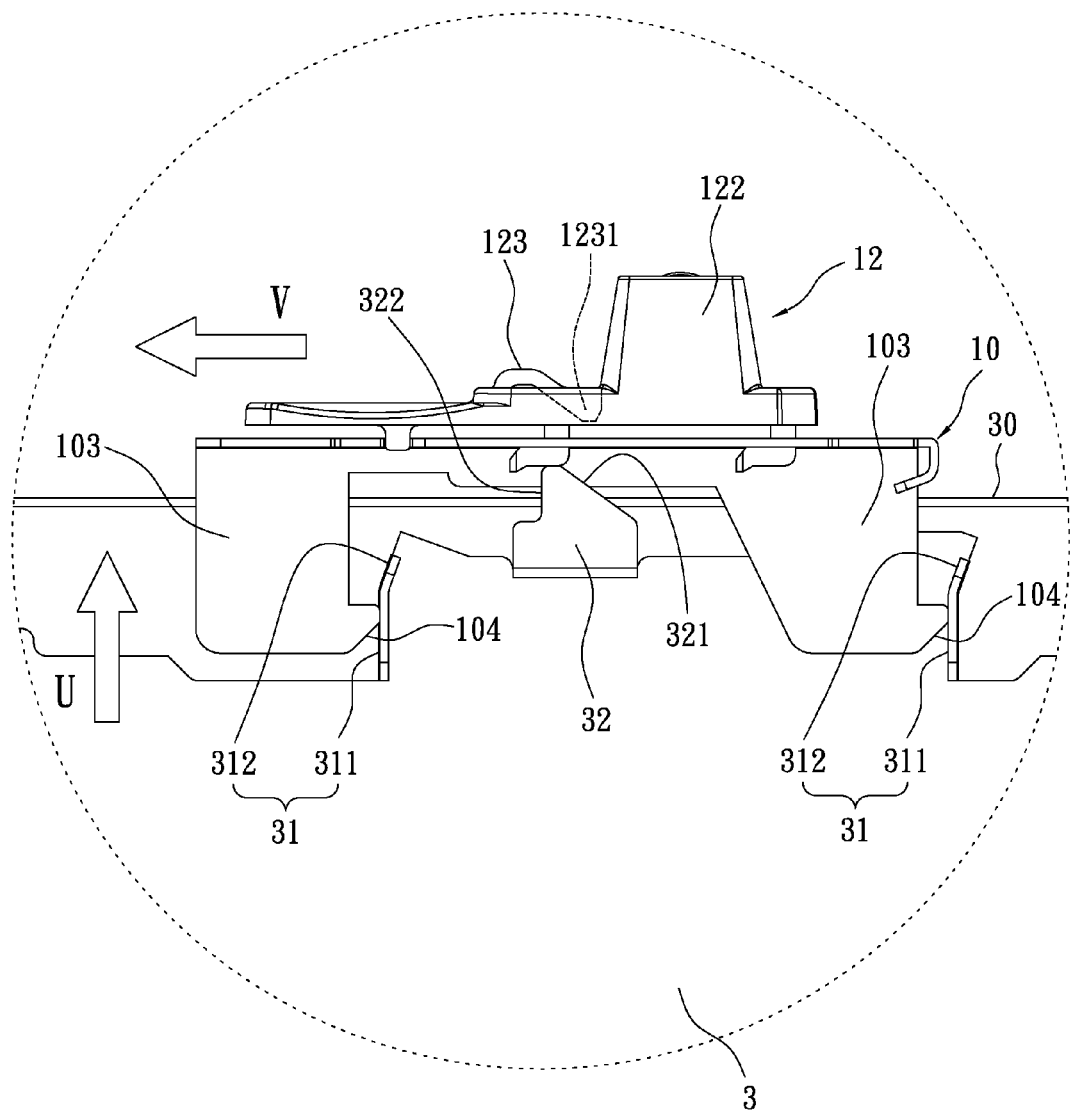
FIGS. 3C to 3D show the movement of the latching module and the cover plate of the instant disclosure while the cover plate is disassembled form the main housing.
Figure 3B:
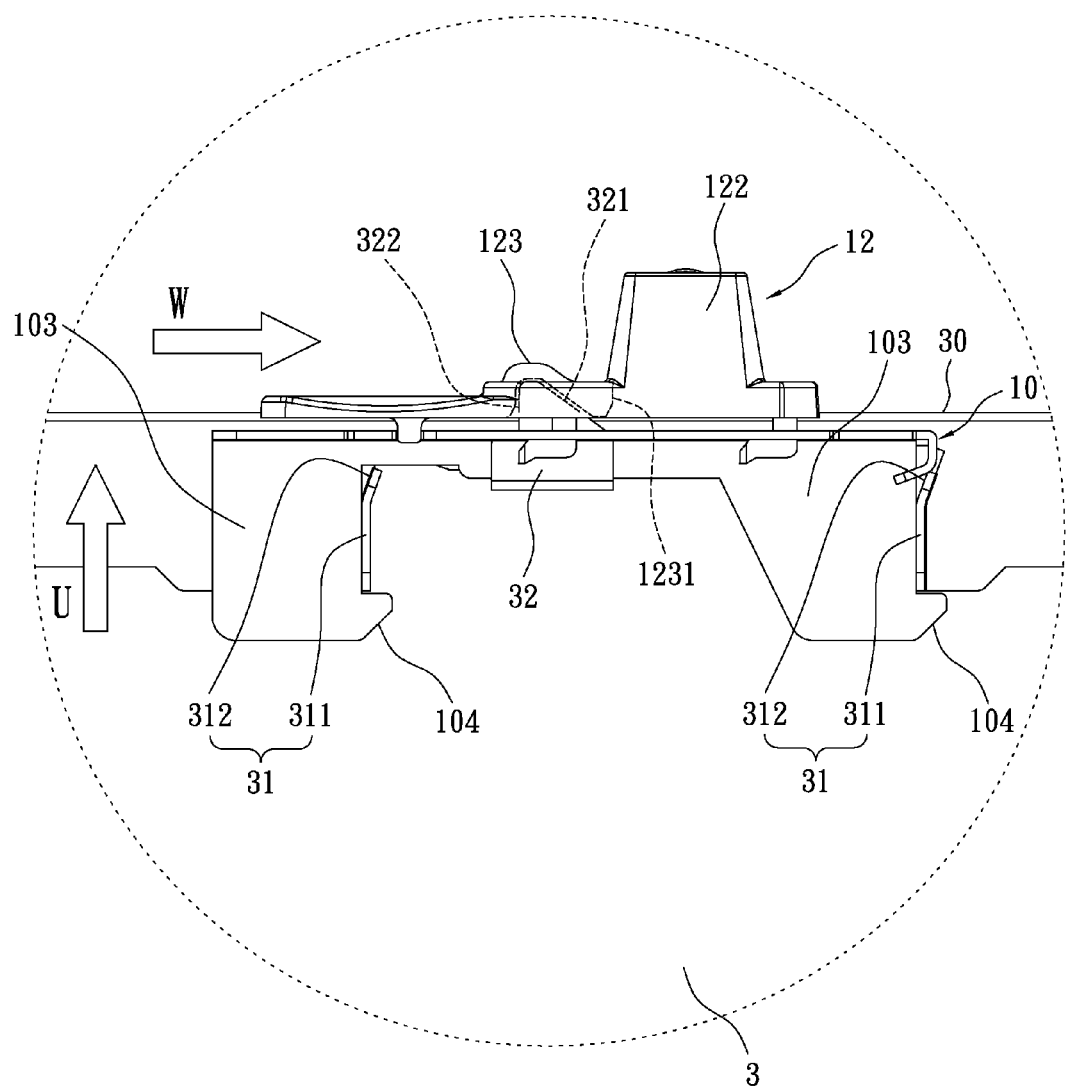
Figure 4A:
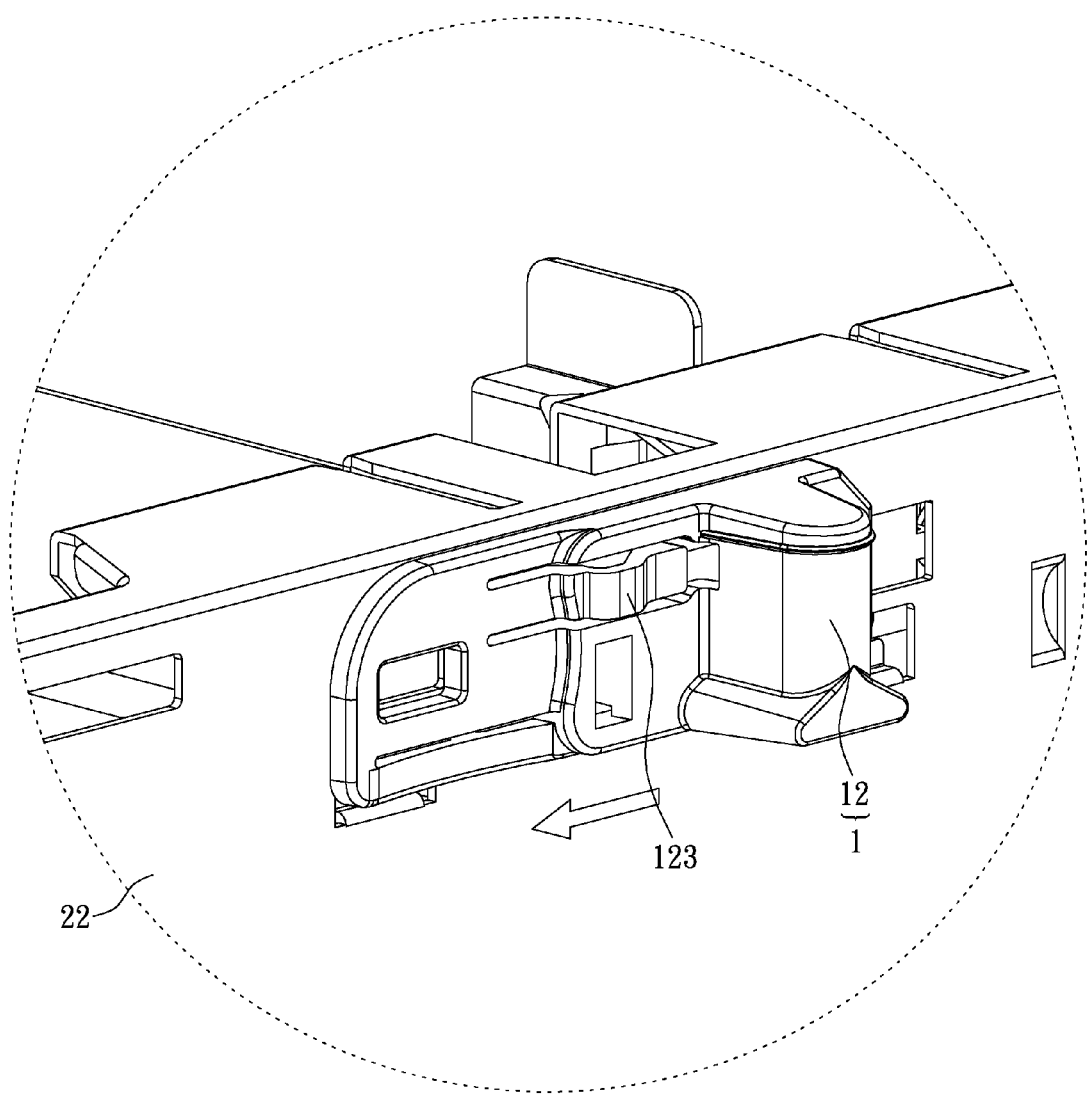

As shown in FIGS. 3 to 3B, which are the bottom views inside the receiving compartment and does not show the side plate 22 for the sake of conciseness, while assembling the cover plate 3 with the main housing 2, the cover plate 3 is forced to slide onto the main housing 2 as shown by the arrow "S" in FIG. 1 and the arrow "U" in FIG. 3. In assembling, each stator portion 31 on the rear flange 30 of the cover plate 3 interferes with the corresponding locking hook portion 103 of the first locking member 10. At this time, the structure with the arc-portion or the bent portion of the stator portion 31 and the first guiding inclined-surface 104 of the locking hook portion 103 are cooperated with each other to slide the latching module 1. Specifically, the second stator segment 312 of the stator portion 31 pushes against the first guiding inclined-surface 104 and then the first stator segment 311 abuts against the locking hook portion 103 to slide the first locking member 10 along the track portions 222 as shown in FIG. 4. That is, the latching module 1 slides as shown by the arrow "V" of FIG. 3A and simultaneously the elastic member 11 is deformed, i.e, elongated as shown in FIGS. 4 and 4A. The cover plate 3 is continuously forced to slide until the interference of the stator portion 31 with the locking hook portion 103 ends up, and then the cover plate 3 is fixed in position as shown in FIG. 3B. As the continuous movements shown in FIGS. 3 to 3B, the stator portion 31 slides from the front side of the locking hook portion 103 to the rear side thereof. Meanwhile, the latching module 1 returns rightward as shown by the arrow "W" due to the resilient force of the elongated elastic member 11; therefore, the stator portion 31 is fixedly secured by the locking hook portion 103 so that the cover plate 3 is assembled onto the main housing 2 at the lock position in a one-movement manner, as shown in FIG. 3B. On the lock position, the front end of the block portion 32 penetrates through the fourth hole 105 of the plate body 101 of the first locking member 10 and the second hole 221B of the side plate 22 so that the front end of the block portion 32 protrudes out of the side plate 22. Hence, the edge of the protruded front end of the block portion 32 (e.g. the second guiding inclined-surface 321) can be close to the free end 1231 of the tongue portion 123.

Figure 3C:
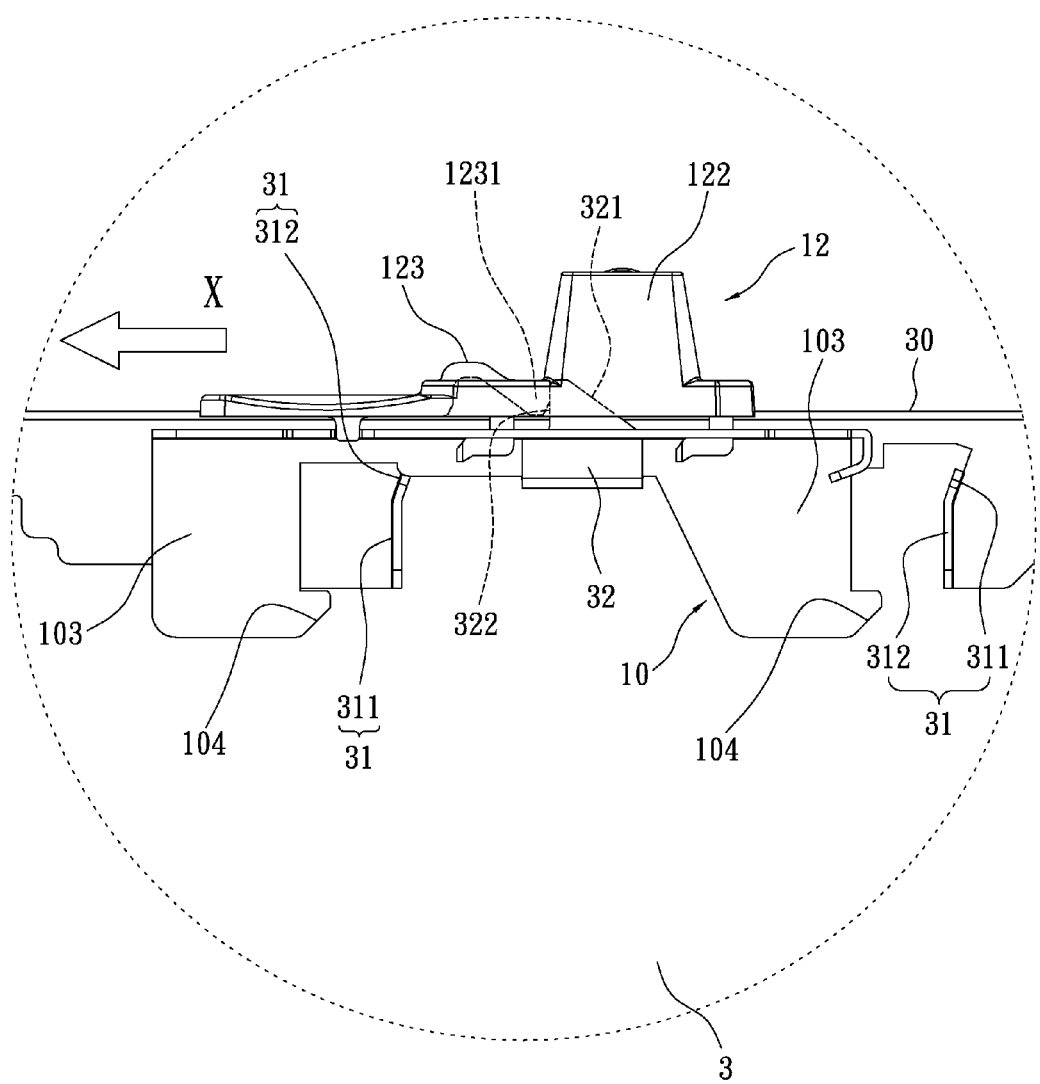
Figure 3D:
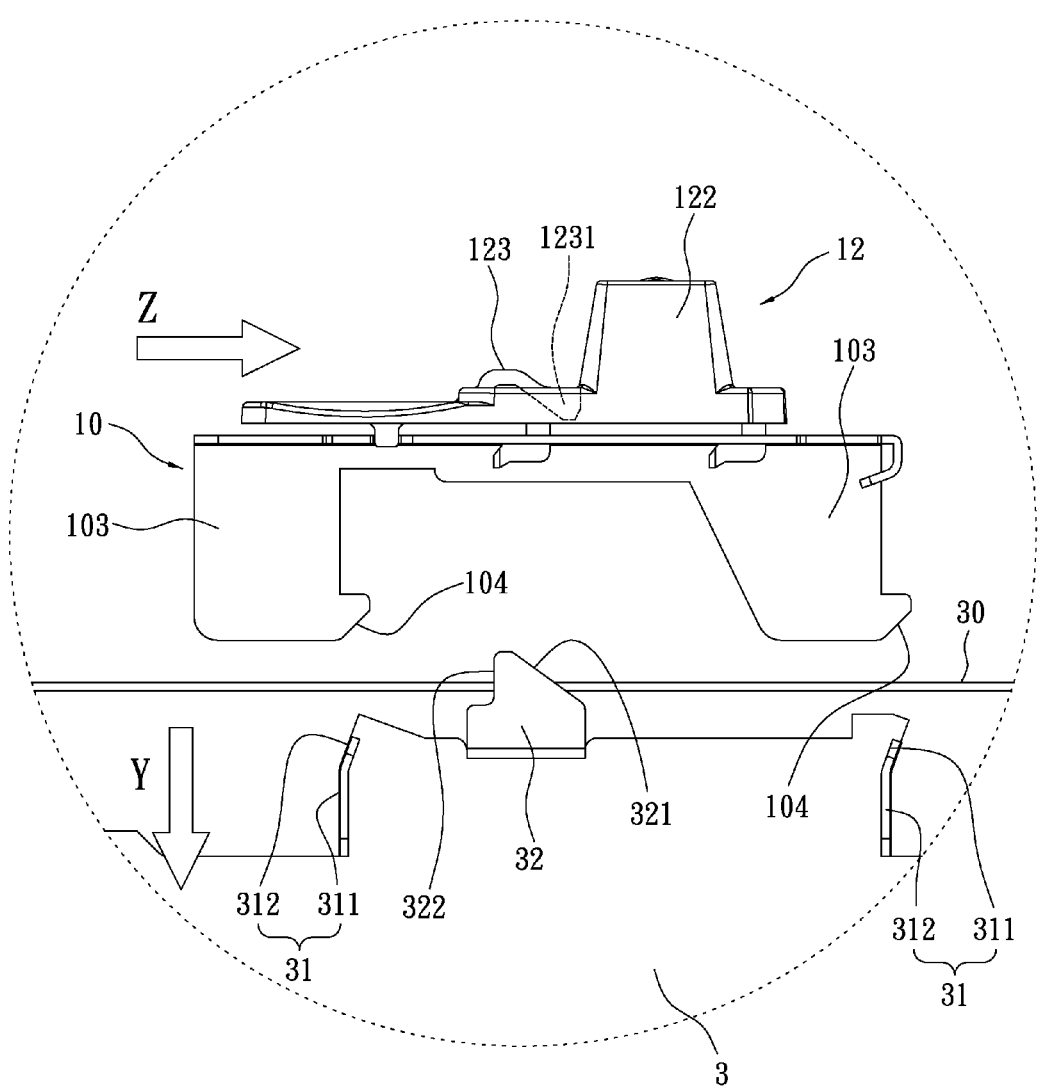

As shown in FIGS. 3C to 3D, which are the bottom views inside the receiving compartment and does not show the side plate 22 for the sake of conciseness, while disassembling the cover plate 3 from the main housing 2, the user firstly pushes the push portion 122 of the second locking member 12 to slide the latching module 1 leftward as shown by the arrow "X" in FIG. 3C. During the sliding of the latching module 1, the free end 1231 of the tongue portion 123 is guided along the second guiding inclined-surface 321 and is thus deformed. At the end of the second guiding inclined-surface 321, the free end 1231 of the tongue portion 123 returns because of the resilient force of the deformed tongue portion 123 and then abuts against the stopper surface 322. At this time, the latching module 1 is temporarily retained at a release position and the stator portion 31 of the cover plate 3 is escaped from the locking hook portion 103 as shown in FIG. 3C; meanwhile, the elastic member 11 is elongated. Since the free end 1231 of the tongue portion 123 abuts against the stopper surface 322 and the latching module 1 is temporarily retained, without the need of holding the latching module 1 by hand, the user can directly draw back the cover plate 3 in the direction opposite to that the cover plate 3 is sliding for assembling, as shown by the arrow "Y" of FIG. 3D, to release the cover plate 3 from the lock position and detach the cover plate 3 from the main housing 2. When the cover plate 3 is drawn out, the free end 1231 of the tongue portion 123 is no longer blocked by the stopper surface 322 of the block portion 32 so that the second locking member 12 rebounds due to the resilient force of the elongated elastic member 11 to return the latching module 1 to the initial position (i.e., the lock position), as shown by the arrow "Z" of FIG. 3D.

By means of the latching module 1 of the instant disclosure, the cover plate 3 can be directly and efficiently assembled onto or disassembled from the main housing 2 of the chassis assembly of a computer or any other apparatus in a screw-less manner.

In summary, the present invention has the following characteristics.

1. While assembling the cover plate to the main housing, the user can merely slide the cover plate on the main housing and efficiently secure the cover plate on the main housing in a one-movement manner.

2. While disassembling the cover plate from the main housing, the user can merely push the latching module to temporarily retain it at the release position by abutting the tongue portion of the second locking member against the stopper surface of the block portion and then draw the cover plate with his/her two hands. It is not necessary for a user to hold on the latching module with one hand and draw the cover plate with the other hand, Therefore, it is more safe and efficient for the user to disassemble the cover plate.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims

What is claimed is:

1. A chassis assembly, comprising:
a main housing (2) having a side plate (22), the side plate having a track portion (222) defined on an inner surface of the side plate (22), and a hole (221B) disposed on the side plate (22) in a sliding path defined by the track portion (222);
a cover unit (3) detachably coupleable to the main housing, including:
a pair of stator portions (31) spacedly arranged at an edge that faces the slide plate (22), and
a block portion (32) consisting essentially of a wedge-shaped planar body protruding from a side edge thereof and arranged between the stator portions (31), and provided with an inclined surface (321) and a stopper surface (322); and
a latching module (1) slidable on the side plate between a locked position and an released position, including:
a first locking member (10) consisting essentially of a plate body (101) being bent to form a pair of substantially coplanar locking hooks (103) arranged along the sliding direction of the latching module, both hooks pointing toward the locked position, configured to respectively engage with the stator portions of the cover unit, wherein the first locking member has a through hole (105) arranged thereon in corresponding alignment with the hole (221B) on the side plate, so as to allow penetration of the block portion through the hole (221B) and the through hole (105) in the locked position, and a second locking member (12) coupleable to the first locking member from an outer surface of the side plate and sandwiching the side plate with the first locking member, including:

an exposed operable push portion (122) configured to receive an external force substantially coplanar with the plate body of the locking hooks (103), and a tongue portion (123) having a free end (1231), arranged between the locking hooks along the sliding direction and positioned in correspondence to the block portion of the cover unit for creating interference with the block portion (32), and the tongue portion (123) configured to:

ride on the inclined-surface (321) of the block portion and be raised thereby as the latching module slides from the locked position toward the released position;

enable the free end (1231) thereof to abut against the stopper surface (322) upon traveling the inclined-surface (321); and retain the latching module at the released position.

2. The chassis assembly of claim 1, wherein the first locking member is arranged on the inner side of the side plate, the plate body is slidably assembled on the track portion and includes a first abutting portion and a plurality of assembling holes; and the second locking member has a plurality of assembling hooks respectively assembled with the assembling holes along the sliding direction of the latching module and a second abutting portion correspondingly assembled to the first abutting portion substantially perpendicular with respect to the sliding direction of the latching module.

3. The chassis assembly of claim 1, wherein the latching module includes an elastic member connecting the latching module and the side plate for providing a biasing force to the latching module in a sliding direction toward the locked position, one end of the elastic member is connected to the first locking member and the other end of the elastic member is connected to the side plate of the main housing.

4. The chassis assembly of claim 1, wherein the locking hook portion has a first guiding inclined-surface, and the stator portion is a bending structure with an arc-portion or a bent portion corresponding to the first guiding inclined-surface.

5. The chassis assembly of claim 1, wherein the stator portion and the block portion are bent from the cover unit.

6. The chassis assembly of claim 2, wherein the side plate has a plurality of first holes and a third hole, the assembling hooks respectively penetrate through the first holes to engage with the assembling holes, so that the second abutting portion penetrates through the third hole to engage with the first abutting portion.

7. The chassis assembly of claim 1, wherein the main housing further has a bottom plate, and the side plate is bent from the bottom plate.

8. The chassis assembly of claim 1, wherein the tongue portion (123) is integrally formed from the second locking member (12).

9. A chassis assembly, comprising:

a main housing (2) having a side plate (22), the side plate having a track portion (222) defined on an inner surface of the side plate (22), and a hole (221B) disposed on the side plate (22) in a sliding path defined by the track portion (222);

a cover unit (3) detachably coupleable to the main housing, including:

a pair of stator portions (31) spacedly arranged at an edge that faces the slide plate (22), and a block portion (32) consisting essentially of a wedge-shaped planar body protruding from a side edge thereof and arranged between the stator portions (31), and provided with an inclined surface (321) and a stopper surface (322); and a latching module (1) slidable on the side plate between a locked position and an released position, including:

a first locking member (10) consisting essentially of a plate body (101) being bent to form a pair of substantially coplanar locking hooks (103) arranged along the sliding direction of the latching module, both hooks pointing toward the locked position, configured to respectively engage with the stator portions of the cover unit, wherein each locking hook has a hook depth (D), and the first locking member has a through hole (105) arranged thereon in corresponding alignment with the hole (221B) on the side plate, so as to allow penetration of the block portion through the hole (221B) and the through hole (105) in the locked position, and a second locking member (12) coupleable to the first locking member from an outer surface of the side plate and sandwiching the side plate with the first locking member, including:

an exposed operable push portion (122) configured to receive an external force substantially coplanar with the plate body of the locking hooks (103), and a tongue portion (123) having a free end (1231), arranged between the locking hooks along the sliding direction and positioned in correspondence to the block portion of the cover unit for creating interference with the block portion (32), and the tongue portion (123) configured to:

ride on the inclined-surface (321) of the block portion and be raised thereby as the latching module slides from the locked position toward the released position;

enable the locking hooks (103) to disengage the stators (31) upon traveling at least a distance of the hook depth (D) from the locked position; and retain the latching module at the released position.

10. A chassis assembly, comprising:

a main housing (2) having a side plate (22), the side plate having a track portion (222) defined on an inner surface of the side plate (22), and a hole (221B) disposed on the side plate (22) in a sliding path defined by the track portion (222);

a cover unit (3) detachably coupleable to the main housing, including:

a pair of stator portions (31) spacedly arranged at an edge that faces the slide plate (22), and a block portion (32) consisting essentially of a wedge-shaped planar body protruding from a side edge thereof and arranged between the stator portions (31), and provided with an inclined surface (321) and a stopper surface (322); and a latching module (1) slidable on the side plate between a locked position and an released position, including:

a first locking member (10) consisting essentially of a plate body (101) being bent to form a pair of substantially coplanar locking hooks (103) arranged along the sliding direction of the latching module, both hooks pointing toward the locked position, configured to respectively engage with the stator portions of the cover unit, wherein the first locking member has a through hole (105) arranged thereon in corresponding alignment with the hole (221B) on the side plate, so as to allow penetration of the block portion through the hole (221B) and the through hole (105), an elastic member (11) connecting the latching module and the side plate for providing a biasing force to the latching module in a sliding direction toward the locked position, and a second locking member (12) coupled to the first locking member from the outer side of the side plate and sandwiching the side plate with the first locking member, including:

a push portion (122) exposedly arranged between the locking hooks along the sliding direction of the latching module and operable from outside the main casing, and a tongue portion (123) having a free end (1231), arranged between the locking hooks along the sliding direction and positioned in correspondence to the block portion of the cover unit for creating interference with the block portion (32), and the tongue portion (123) configured to:

ride on the inclined-surface (321) of the block portion and be raised thereby as the latching module slides from the locked position toward the released position;

enable the free end (1231) thereof to abut against the stopper surface (322) upon traveling at most the length of the inclined-surface (321); and retain the latching module at the released position;

wherein the side plate includes a plurality of first holes (221A) and a third hole (221C);

wherein the first locking member includes a plurality of assembling holes (102) and a first abutting portion (107);

wherein the second locking member includes a plurality of assembling hooks (121) and a second abutting portion (124);

wherein the assembling hooks of the second locking member respectively penetrating through the first holes of the side plate are respectively engageably assembled with the assembling holes of the first locking member along the sliding direction of the latching module;

wherein the second abutting portion of the second locking member penetrating through the third hole of the side plate is correspondingly engageably assembled to the first abutting portion of the first locking member substantially perpendicular with respect to the sliding direction of the latching module.

\* \* \* \* \*